3,766,112
LATEX FOR HIGH GLOSS FLOOR POLISH FORMULATIONS

Edward A. Blackford, Jr., Coraopolis, Pa., assignor to Sinclair-Koppers Company
No Drawing. Filed Oct. 5, 1972, Ser. No. 295,278
Int. Cl. C08f 45/30
U.S. Cl. 260—28.5 R     5 Claims

ABSTRACT OF THE DISCLOSURE

An internally plasticized and cross-linked acrylic type emulsion polymer is produced by incorporating a chlorinated paraffin wax into the polymer through the use of a polyvinyl pyrrolidone protective colloid. The polymer emulsion is particularly suitable for use in preparing high gloss floor polish compositions.

BACKGROUND OF THE INVENTION

This invention relates to an emulsion polymer composition which is particularly suitable for use in preparing floor polish compositions having high gloss and inherent water resistance.

Many types of floor polish compositions are known which can be applied to floors to provide, upon drying, a protective coating to the floor. Emulsion floor polish compoitions usually include as principal ingredients a water-insoluble emulsion polymer or latex to provide toughness, high gloss, and durability to the coating, and a mixture of a wax and an alkali soluble resin to provide a film forming matrix for the emulsion polymer. The balance of the polish usually includes emulsifying agents, dispersing agents, plasticizers, water and other special purpose additives.

The water insoluble emulsion polymer, which normally comprises the major proportion of the polish formulation, may be either a single polymer latex or a blend of polymer latexes selected for particular individual characteristics. The desired latex should be of as small a particle size as possible to afford good gloss characteristics, should have good inherent water resistance, and should be a good film former with a minimum amount of external plasticization. The single polymer latex offers the advantage of better gloss than most blends, probably due to the narrower particle size distribution of a single polymer and to the fact that when two or more latexes are blended the slight incompatibility of the two latexes may produce a slight haze in the blend.

The single polymer latex generally requires a greater degree of plasticization than a blend of two latexes. Plasticization is necessary to allow the resultant polish to form a continuous film at room temperature or below.

SUMMARY OF THE INVENTION

An internally plasticized and cross-linked acrylic type emulsion polymer latex has been prepared by emulsion polymerizing a monomer solution of 70–85% by weight of styrene, 5–15% by weight of 2-ethylhexyl acrylate, 3–10% by weight of acrylic acid or methacrylic acid, and 1.0–5.0% by weight of at least one monomer selected from the group consisting of itaconic acid, dibutyl itaconate dibutyl fumarate, acrylamide, diacetone acrylamide, hydroxymethyl acrylamide, and hydroxymethyl diacetone acrylamide in the presence of from 0.01–0.65 based on total monomers of polyvinylpyrrolidone and 2–10% by weight based on total monomers of a 30–70% chlorinated paraffin wax. The latex has particular utility in making a floor polish formulation having high gloss properties.

DETAILED DESCRIPTION OF THE INVENTION

I have now found that an interally plasticized and cross-linked acrylic type emulsion polymer can be prepared by polymerizing certain monomers in the presence of a chlorinated paraffin wax and a polyvinylpyrrolidone protective colloid. The resulting polymer emulsion is particularly suitable for use in a floor polish having improved gloss when used in conjunction with an alkali-soluble resin, a suitable wax and surfactants.

The emulsion polymer of the present invention is a multipolymer of 70–85% styrene, 5–15% 2-ethylhexyl acrylate, 3–10% acrylic acid or methacrylic acid, and 1.0–5.0% of at least one monomer selected from the group consisting of itaconic acid, dibutyl itaconate, dibutyl fumarate, acrylamide, diacetone acrylamide, hydroxymethyl acrylamide and hydroxymethyl diacetone acrylamide. The preferred composition is 78% styrene, 11.5% 2-ethylhexyl acrylate, 5% acrylic acid and 2% dibutyl fumarate.

Also included in the monomer mixture in the present invention is a chlorinated paraffin wax. The waxes suitable for the invention are normally liquid paraffins containing from 30–70% chlorine, such as the chlorinated waxes sold commercially as Chlorowax® by Diamond Shamrock Chemical Company. The waxes may have a viscosity, as measured at 25° C. on a Brookfield viscometer, of between 7 and 150 poises. These waxes are useful in amounts between 2 and 10% based on total monomers charged.

In order to insure that the chlorinated paraffin waxes will stay encapsulated into the polymer emulsion and to provide stability of the latex to freeze thaw cycles, a protective colloid is used. Preferably, the protective colloid is polyvinylpyrrolidone having a molecular weight of between 10,000 and 160,000. The polyvinylpyrrolidone is used in amounts between 0.01 and 0.065% based on total monomers charged. Use of less than 0.01 part polyvinylpyrrolidone did not increase the stability of the emulsion; while greater than 0.065 part resulted in formation of curd. When 0.125 part of this material is used, the entire reaction mass sets up. If desired, additional crosslinking can be obtained through the inclusion into the monomer mixture of 2–5% by weight of a crosslinking monomer, such as hydroxymethyl acrylamide or hydroxymethyl diacetone acrylamide.

Organic surface active agents, or surfactants, are also used in the preparation of the latexes of the invention, and the amount used can vary from about 2 to 4% based on total monomers charged. These surfactants enable the formation of a colloidal solution for the polymerization. Various surfactants are usable, such as the alkyl aryl sulfonates, organo phosphate esters, sulfated esters of fatty acids, sodium dodecyl diphenyl ether disulfonates, dialkyl esters of succinic acid and other soluble anionic surfactants. Also, nonionic surfactants are usable, such as the alkyl phenyl polyethoxy ethanols, organo silicones, fluorocarbon surfactants, and the like. Particularly useful in the present invention is a mixture of the anionic surfactant, sodium lauryl sulfate, and the nonionic surfactant, nonylphenyl polyethylene glycol ether.

The polymerization catalyst or initiator used to produce the novel latex of the present invention is preferably one of the low temperature redox catalysts, such as a mixture of sodium formaldehyde sulfoxylate, tert-butyl hydroperoxide, and a ferrous salt, such as ferrous ammonium sulfate. The amount of catalyst used is normally about 0.1 to 2.0% based on total monomers charged.

The polymerization is carried out in aqueous acidic emulsion, the amount of water being varied according to the solids content desired in the final latex. Generally preferred is a ratio of water to monomer such that a latex having a total solids content, i.e., copolymer, surfactants and electrolytes, of about 30–50% is produced. The preferred range of solids is from 35 to 45%.

The preferred polymerization process is a batch-on-batch emulsion process. The monomers and the chlorinated paraffin wax are pre-mixed to form a monomer solution. This monomer solution is then divided into two parts. The first part of the monomer mix (50–80% of total) is polymerized at 40° C. in the presence of water containing a mixed anionic-nonionic soap, the polyvinylpyrrolidone, the ferrous salt, a 10–20% portion of the sodium formaldehyde sulfoxylate, and an amount of tert-butyl hydroperoxdie proportionate to the amount of monomer mix used. When the reaction mixture reaches a peak exothermic, the mixture is quickly cooled to 40° C. and the remaining monomer solution and hydroperoxide is then added along with an additional 10–15% of the sulfoxylate catalyst. As the polymerization temperature rises due to the exothermic reaction, the remaining sulfoxylate catalyst is added and the temperature allowed to peak. The mixture is maintained at this peak temperature (about 70–80° C.) until complete conversion of the monomers to latex is obtained. The mixture is then cooled, brought to a pH of 8–10 preferably by the addition of ammonium hydroxide, and filtered.

The latex thus prepared has been found to be excellently suited as an ingredient in floor polish compositions having good gloss properties.

Generally, the total solids content of a floor polish composition ranges from about 5 to about 30% by weight of the composition. The preferred total solids content of the polish for producing ease of application is from about 10 to about 20%. The remainder of the composition is generally aqueous and usually is water.

When used in the floor polish composition, the aqueous polymer emulsion usually contains 10 to 20% polymer, based on the weight of the polymer emulsion. The polymer or solids content of the aqueous emulsion polymer usually comprises 50 to 80% by weight of the total solids present in polish compositions and normally is the major solid constituent present in the polish composition.

The remainder of the polish composition is usually made up of an alkali-soluble resin, a waxy material, and various leveling or coalescing agents, all of which are generally known in the art. The particular polish components that are added to the novel emulsion polymer of the invention are up to the user. These components are familiar to the polish formulation art and are not critical to the present invention.

Suitable alkali-soluble resins are rosin acid, maleate-modified rosin acid ester, shellac, styrene-maleic anhydride copolymers, polyesters or alkali soluble alkyds, pentaerythritol esters of rosin, manilla gum, Loba gum and the like. The alkali soluble resins are usually added to the floor polish composition as an aqueous emulsion containing 10–20% resin based on the weight of the emulsion. The resin usually comprises 10 to 30% by weight of the total solids present in the polish composition.

Suitable waxes, which are generally added as about a 10–20% by weight aqueous emulsion, are the animal, vegetable and synthetic waxes such as carnauba, polyethylene, polypropylene, oxidized microcrystalline paraffin wax, beeswax, montan, and the like. For addition to floor polish compositions, these waxes are dispersed in water with surface active agents such as sorbitol condensate adducts, polyglycol ether products, alkail or amine salts of fatty acids, sulfates, and sulfonates. The waxes usually comprise 5 to 20% by weight of the total solids present in the polish composition.

In addition, about 0.5–1% based on the total polish composition of a leveling or coalescing agent is added, such as tributoxy ethyl phosphate, triethyl phosphate, tributyl phosphate, tricresyl phosphate, triphenyl phosphate, diethylene glycol monomethyl ether, diethylene glycol monoethyl ether and the like.

For a clearer understanding of the invention, specific examples of it are set forth below. These examples are merely illustrative of this invention and are not to be understood as limiting the scope and underlying principles of the invention in any way. All percentages referred to herein are by weight unless otherwise specifically indicated.

Example I

A monomer solution was prepared consisting of 78 parts of styrene, 5 parts of acrylic acid, 1.5 parts of 2-ethylhexyl acrylate, 2 parts of dibutyl fumarate, and 3.5 parts of chlorinated paraffin wax containing 60% chlorine. One half of this monomer mixture was charged to a polymerization reactor along with 157 parts of water, $0.8 \times 10^{-6}$ parts of ferrous salt, 1.6 parts of sodium lauryl sulfate, 0.67 part of nonylphenyl polyethylene glycol ether, 0.06 part of polyvinyl pyrrolidone (molecular weight 40,000), and 0.15 part of tert-butyl hydroperoxide. The charge was agitated and heated to 40° C., at which temperature 1.5 parts of a 2% aqueous solution of sodium formaldehyde sulfoxylate was added. The reaction was allowed to proceed with agitation until the temperature of exothermic polymerization reached a peak (about 65° C.). The reaction charge was then cooled quickly to 40° C., and the remaining monomer mixture added along with 0.15 part of tert-butyl hydroperoxide and 1.5 parts of sodium formaldehyde sulfoxylate solution. The temperature was allowed to rise to 47° C., at which time an additional 7.0 parts of the sulfoxylate solution was added. The temperature was again allowed to peak at the exotherm (about 75° C.) and held at that temperature for 25 minutes or until the residual monomer content was below 0.5%. The charge was then cooled to room temperature and neutralized to pH 7.0–7.5 with ammonium hydroxide to give a final product having 36.7% solids.

Example II

In order to prepare the latex of Example I at a higher level of solids, the following procedure was followed:

A monomer solution was prepared identical with that of Example I. An 80% portion of this monomer solution was charged to the polymerization reactor along with 138 parts of water, $0.8 \times 10^{-6}$ part of ferrous salt, 0.8 part of sodium lauryl sulfate, 0.34 part of nonylphenyl polyethylene glycol ether, 0.02 part of polyvinylpyrrolidone, and 0.264 part of tert-butyl hydroperoxide. The charge was agitated and heated to 40° C., at which temperature 2.2 parts of a 2% aqueous solution of sodium formaldehyde sulfoxylate was added. The reaction was allowed to proceed with agitation until the temperature of exothermic polymerization reached a peak (about 60–65° C.). The charge was then cooled quickly to 40° C., and the remaining monomer solution added along with 0.066 part of tert-butyl hydroperoxide and 1.1 parts of sulfoxylate solution. The temperature was allowed to rise to 47° C., at which time an additional 7.7 parts of the sulfoxylate solution was added. The temperature was again allowed to peak at the exotherm (about 80° C.) and held at that temperature for 15 minutes. The charge was then cooled, neutralized, and filtered to give a latex having 40.5% solids.

It should be noted that due to the higher viscosities encountered in the preparation of higher solids latex, the amount of surfactants used was only half that used in Example I. The amount of protective colloid, polyvinylpyrrolidone, used was also less (0.02 part) because of cured formation when the higher concentrations (0.06) were used. Further, the concentration of the redox catalyst system (sulfoxylate-hydroperoxide) was increased 10% because of the decreased reactivity of the high solids system.

Example III

A monomer solution containing a total of 103 parts of monomers was prepared consisting of 75.8% of styrene, 11.1% of 2-ethylhexyl acrylate, 4.9% of acrylic acid, 1.9% of dibutyl fumarate, 2.9% of hydroxymethyl diacetone acrylamide, and 3.4% of 60% chlorinated paraffin wax. The procedure of Example II was followed to produce a latex having 40.7% solids. The addition of the hydroxymethyl diacetone acrylamide was for the purpose of giving additional crosslinking to the polymeric latex. Polishes prepared from this latex were shown to have high gloss and improved resistance to black heel marking.

Example IV

The latex from Example I was diluted with water to make a latex polymer emulsion having 15% solids. A floor polish was made from this latex using the following formulation:

| Function | Ingredient | Parts |
|---|---|---|
| Polymer emulsion | 15% solids latex—Ex. I | 61.3 |
| Alkali-sol. resin | 15% solution of SMA 2625A [1] | 17.3 |
| Wax | 15% solution of AC-629 [2] | 8.7 |
| Wax | 15% solution of Epolene E-15 [3] | 1.3 |
| Leveling agent | 1% solution of FC-128 [4] | 0.2 |
| Do | Carbitol [5] | 1.0 |
| Plasticizers | KP140 [6] | 1.0 |
|  | Ethylene glycol | 0.3 |
|  | 2-pyrrolidone | 0.2 |
| Water (to adjust to 17% solids polish). |  | 5.7 |

[1] Styrene-maleic anhydride copolymer.
[2] Low molecular weight polyethylene wax, M.P. 213–221° F., Allied Chemical Corp.
[3] Low molecular weight polyethylene wax, Eastman Chemical Products Company.
[4] A fluorocarbon surfactant, Minnesota Mining & Mfg. Company.
[5] Diethylene glycol monoethyl ether.
[6] Tributoxyethyl phosphate, FMC Corp.

The resulting polish was coated onto a solid vinyl, black floor tile and the gloss readings read with a Gardner gloss meter using a 60° head. The values are compared with those obtained for a commercial floor polish in Table I(A). A similar comparison wherein the samples were recoated after ½ hour and 24 hours is shown in Table I(B). Comparative results wherein the sample was buffed after 1 hour and 24 hours are shown in Table I(C).

TABLE I
Gloss Readings

| Test number | | Example III | Commercial #1 | Commercial #2 |
|---|---|---|---|---|
| (A) | Uncoated | 54.3 | 53.6 |  |
|  | Coated | 91.7 | 87.5 |  |
| (B) | Uncoated | 59.1 |  | 58.9 |
|  | Coated | 93.4 |  | 87.2 |
|  | ½ hr. recoat | 93.0 |  | 89.3 |
|  | 24 hr. recoat | 95.5 |  | 89.5 |
| (C) | Uncoated | 48.1 |  | 47.6 |
|  | Coated | 92.9 |  | 89.6 |
|  | 1 hr. buff | 92.5 |  | 90.5 |
|  | 24 hr. buff | 92.4 |  | 88.9 |

In all cases, the polish from the latex of the present invention showed better gloss values than the commercially available polish formulations.

What is claimed is:

1. An internally plasticized and cross-linked acrylic type emulsion polymer comprising a polymer of 70–85% styrene, 5–15% 2-ethylhexyl acrylate, 3–10% acrylic acid or methacrylic acid, and 1.0–5.0% of at least one monomer selected from the group consisting of itaconic acid, dibutyl itaconate, acrylamide, dibutyl fumarate, diacetone acrylamide, hydroxymethyl acrylamide, and hydroxymethyl diacetone acrylamide; said polymer having 2–10% based on total monomer of a 30–70% chlorinated paraffin wax encapsulated therein by means of 0.01–0.065% of a polyvinyl pyrrolidone protective colloid having a molecular weight of between 10,000 and 160,000.

2. A process for preparing an internally plasticized and cross-linked polymer latex comprising:
(a) forming a total monomeric mixture comprising 70–85% of styrene, 5–15% of 2-ethylhexyl acrylate, 3–10% of acrylic acid, or methacrylic acid, 1.0–5.0% of at least one monomer selected from the group consisting of itaconic acid, dibutyl itaconate, dibutyl fumarate, acrylamide, diacetone, acrylamide hydroxymethyl acrylamide, and hydroxymethyl diacetone acrylamide, and 2–10% of 50–70% chlorinated paraffin wax;
(b) polymerizing in aqueous acidic emulsion a 50–80% by weight portion of said monomeric mixture in the presence of a mixture of anionic and nonionic surfactants in water containing 0.01 to 0.065% by weight of a polyvinylpyrrolidone protective colloid and a redox catalyst system; said polymerization being initiated at 40° C. and being allowed to reach a peak exothermic temperature of about 60–70° C.;
(c) cooling the polymerizing mixture to 40° C., and adding the remaining total monomer mixture and additional redox catalyst;
(d) polymerizing in aqueous acidic emulsion the resulting mixture at 40° C. and allowing the mixture to again reach a peak exothermic temperature of about 70–80° C. and maintaining the peak temperature until complete conversion of monomers to form a latex having from 35–55% solids.

3. The process of claim 2 wherein said total monomeric mixture consists of 78% of styrene, 11.5% of 2-ethylhexyl acrylate, 5% of acrylic acid, 2.0% of dibutyl fumarate, and 3.5% of a 60% chlorinated paraffin wax.

4. The process of claim 2 wherein said total monomeric mixture consists of 75.8% of styrene, 11.1% of 2-ethylhexyl acrylate, 4.9% of acrylic acid. 1.9% of dibutyl fumarate, 2.9% of hydroxymethyl diacetone acrylamide, and 3.4% of a 60% chlorinated paraffin wax.

5. In a process for polymerizing in aqueous acidic emulsion at a temperature of 40–80° C., in the presence of a redox catalyst a monomeric mixture of 70–85% by weight of styrene, 5–15% by weight of 2-ethylhexyl acrylate, 3–10% by weight of acrylic acid, or methacrylic acid and 1.0–5.0% by weight of at least one monomer selected from the group consisting of itaconic acid, dibutyl itaconate, dibutyl fumarate, acrylamide, diacetone acrylamide, hydroxymethyl acrylamide, and hydroxymethyl diacetone acrylamide, the improvement comprising polymerizing said monomeric mixture in the presence of 2–10% by weight of a 50–70% chlorinated paraffin wax and 0.01–0.065% by weight of a polyvinylpyrrolidone protective colloid having a molecular weight of between 10,000 and 160,000; whereby said wax is encapsulated within said polymeric latex to form an internally plasticized and cross-linked emulsion polymer.

No references cited.

THEODORE MORRIS, Primary Examiner
P. R. MICHL, Assistant Examiner

U.S. Cl. X.R.
260—28.5 AV, 66, 78.5 R, 78.5 E, 80.73